United States Patent
Koike et al.

(10) Patent No.: US 12,286,962 B2
(45) Date of Patent: Apr. 29, 2025

(54) BINARY POWER GENERATION SYSTEM UTILIZING RENEWABLE ENERGY SUCH AS GEOTHERMAL HEAT

(71) Applicants: Hiroyuki Koike, Kanagawa (JP); CALFA CHEMICAL CO., LTD., Kanagawa (JP)

(72) Inventors: Hiroyuki Koike, Kanagawa (JP); Keiji Koike, Kanagawa (JP)

(73) Assignees: CALFA CHEMICAL CO., LTD., Kanagawa (JP); Hiroyuki Koike, Kanagawa (JP)

( * ) Notice: Subject to any disclaimer, the term of this patent is extended or adjusted under 35 U.S.C. 154(b) by 0 days.

(21) Appl. No.: 18/039,327

(22) PCT Filed: Jan. 26, 2023

(86) PCT No.: PCT/JP2023/003299
§ 371 (c)(1),
(2) Date: May 30, 2023

(87) PCT Pub. No.: WO2024/029107
PCT Pub. Date: Feb. 8, 2024

(65) Prior Publication Data
US 2025/0075683 A1    Mar. 6, 2025

(30) Foreign Application Priority Data

Aug. 5, 2022 (JP) ................. 2022-125364

(51) Int. Cl.
*F03G 4/00* (2006.01)
*B01D 29/00* (2006.01)
*C02F 5/08* (2023.01)

(52) U.S. Cl.
CPC ............. *F03G 4/001* (2021.08); *B01D 29/00* (2013.01); *C02F 5/083* (2013.01)

(58) Field of Classification Search
CPC .......... F03G 4/001; B01D 29/00; C02F 5/083
See application file for complete search history.

(56) References Cited

U.S. PATENT DOCUMENTS 5,665,242 A * 9/1997 Gallup .................... C02F 5/083
                                                              422/12
5,858,245 A * 1/1999 Gallup ..................... C02F 5/10
                                                              210/698

(Continued)

FOREIGN PATENT DOCUMENTS

JP        H09299961 A    11/1997
JP        2002001392 A    1/2002

(Continued)

*Primary Examiner* — Hoang M Nguyen
(74) *Attorney, Agent, or Firm* — BACON&THOMAS, PLLC

(57) ABSTRACT

A scale inhibiting agent having silicon dioxide ($SiO_2$) and sodium oxide ($Na_2O$) as main components is put into each of a circulation flow channel in a hot water circulation system and a circulation flow channel in a cooling water circulation system. On the other hand, a solid-liquid separation device is installed at an appropriate position of each of the circulation flow channel in the hot water circulation system and the circulation flow channel in the cooling water circulation system, the solid-liquid separation device storing a lot of filter mediums each of which is provided with a lot of rectangular water stream inlets in a staggered pattern along a peripheral direction, is provided with a semicircularly curved water stream control plate extending inward from a short side in one side of each of the water stream inlets and has a diameter of 12 mm and a length of 12 mm.

7 Claims, 4 Drawing Sheets

(56) References Cited

U.S. PATENT DOCUMENTS

| | | | | |
|---|---|---|---|---|
| 2010/0176060 A1* | 7/2010 | Duarte | .................... | F28F 25/00 |
| | | | | 210/96.1 |
| 2014/0083949 A1* | 3/2014 | Takahashi | ................. | C02F 1/20 |
| | | | | 210/96.1 |
| 2023/0076219 A1* | 3/2023 | Fleckenstein | ........... | F24T 50/00 |

FOREIGN PATENT DOCUMENTS

| | | | |
|---|---|---|---|
| JP | 2013059733 | A | 4/2013 |
| JP | 2013180912 | A | 9/2013 |
| JP | 2014173800 | A | 9/2014 |
| JP | 2016168559 | A | 9/2016 |
| JP | 2016200035 | A | 12/2016 |
| JP | 2017080653 | A | 5/2017 |
| JP | 2017198142 | A | 11/2017 |
| JP | 2018031357 | A | 3/2018 |

* cited by examiner

BINARY POWER GENERATION SYSTEM UTILIZING RENEWABLE ENERGY SUCH AS GEOTHERMAL HEAT

TECHNICAL FIELD

The present invention relates to a binary power generation system utilizing renewable energy such as geothermal heat.

BACKGROUND ART

In recent years, various binary power generation systems utilizing renewable energy such as geothermal heat or solar heat have been developed and provided for use, and have attracted attention. In these binary power generation systems utilizing renewable energy such as geothermal heat or solar heat, a heat exchanger is frequently used. However, in a water channel system in the binary power generation system, a heat conduction inhibitor (scale) is generated in an inner portion of the water channel system together with a continued use, and the heat conduction inhibitor (scale) is attached to a surface within a plumbing constructing the water channel system and a surface of a plate in a heat exchanger. Then, it becomes deposited little by little, so that water circulation is deteriorated, and a sufficient heat exchange cannot be achieved. If the scale is attached to the surface of the plate within the heat exchanger, the heat exchanger effectiveness is rapidly lowered.

More specifically, the plate type heat exchanger is very thin. Therefore, the calcium based scale or the magnesium based scale can be cleaned by a closed circulation chemical with a dilute hydrochloric acid or a dilute sulfuric acid at several times. However, the silica based scale uses a fluoride based strong corrosive chemical such as an ammonium fluoride and is therefore corroded immediately by the closed circulation chemical. As a result, it is necessary to disassemble the heat exchanger and exchange the plate. Therefore, a fight against the silica based scale is the most important problem in a binary power generator.

As a result, a power generation capacity is lowered little by little, and the binary power generation system eventually stops. In the heat conduction inhibitor (scale), the calcium (Ca), the magnesium (Mg) and the silicon (Si) mainly contained in the water are concentrated in a cooling tower, a suspended solid matter in water (SS) is generated, is eventually aggregated and is attached as the heat conduction inhibitor (scale) onto the surface within the plumbing and the surface of the plate in the heat exchanger.

Accordingly, it is a pressing issue to prevent the heat conduction inhibitor (scale), in particular the silica based scale from being attached to the surface of the plate within the plumbing and the heat exchanger constructing the water channel system without stopping the operation of the device.

Further, in the silica and the calcium among the scale components, the silica is twice the calcium in a case of the same thickness in view of the reduction of the heat conductivity. In the water channel system of the conventional binary power generation system, it has been a pressing issue to efficiently remove the silica based scale which is attached and deposited to the inner surface of the plumbing constructing the water channel system.

Two methods, that is, a preventing method and a removing method are provided as a conventional scale countermeasure, one of them is prevention of scale generation, and another is removal of scale generated in the heat exchanger.

For a specific means, the scale preventing countermeasure generally employs using a phosphonate-based, polyacrylic-based or polymaleic acid based polymer coagulant for a fine particle causing the scale, injecting it into the water channel system, coarse flocking a microparticle causing the scale and discharging the microparticle out of the cooling water system together with drainage water, in a case of the calcium scale. Further, in general, a filter utilizing a membrane or a strainer and a sand or an anthracite is frequently used. However, in fact, the polymer coagulant is not sufficiently effective for the silica based scale.

On the other hand, the method of removing the scale generated in the plate type heat exchanger employs a method (non-open cleaning method) of stopping an operation of the system, putting a chemical (dilute hydrochloric acid or dilute sulfuric acid) into a circulating water system in a plate portion of a heat exchanger, and removing a scale such as a calcium scale by a circulation cleaning, and a waste liquid is chemically treated and disposed.

However, the chemical cleaning by the non-open cleaning cannot obtain a sufficient effect for the removal of the silica based scale, and a great reduction of an operation rate in the binary power generation utilizing the geothermal heat becomes a great problem.

Accordingly, in order to remove the silica based scale, it is in general necessary to stop the operation of the system without performing the non-open cleaning, disassemble and detach the plate having a heavy weight between several Kg and several tens Kg, and clean the plate one by one while using a dangerous chemical (ammonium bifluoride), so that the plate of the heat exchanger is corroded. Thus, there has been employed a method of replacing with a new plate which is separately prepared or the other plate which is previously cleaned by a physical cleaning such as a brush cleaning, called as a plate rotation system.

Only this method has been provided for the means for removing the silica based scale, the amount of time and effort required and the financial burden have been immeasurable.

Therefore, the reduction of heat conductivity and the reduction of the operation rate caused by the scale, in particular the silica based scale of the heat exchanger have been a great problem for the greatest reason why the binary power generation utilizing renewal energy such as geothermal heat has not become widely used.

The present invention is completed for providing a method for dissolving the problem caused by the scale, in particular the silica based scale which is the greatest reason why the binary power generation has not become widely used.

However, the use of the liquid organic synthetic chemical in the scale countermeasure as mentioned above is risky, may result in causing damage in the health of the operator and may result in causing adverse effects for a surrounding environment. In particular, the phosphonic acid (organic phosphorus based compound) frequently used as the scale inhibitor causes the eutrophication for the water scattered from the cooling tower and the river, lake and sea area, and is therefore prohibited to be used in many countries. Thus, there is a need for the scale prevention system that does not have a negative impact on the environment.

SUMMARY OF INVENTION

Technical Problem

The present invention is made by taking into consideration the above points, and an object of the present invention is to provide a binary power generation system utilizing renewable energy such as geothermal heat configured to prevent a scale from being attached to a surface within a plumbing constructing a water channel system and a surface of a plate in a heat exchanger, thereby preventing a power generation capacity of the binary power generation from being lowered.

Solution to Problem

Accordingly, the gist of the present invention exists in a binary power generation system constituted by a heat source such as a geothermal heat, a hot water circulation system which circulates a hot water heated by the heat source, a working medium circulation system including a turbine which circulates a working medium and is rotated by a steam, and a power generator, and a cooling water circulation system which circulates a cooling water cooled by a cooling tower, and utilizing renewable energy such as geothermal heat, wherein a scale inhibiting agent including silicon dioxide ($SiO_2$) and sodium oxide ($Na_2O$) as main components is put into each of a circulation flow channel in the hot water circulation system and a circulation flow channel in the cooling water circulation system, the scale inhibiting agent being a massive form and having cracks each having a depth between 1 mm and 1.5 mm from a surface thereof, and a solid-liquid separation device is installed at an appropriate position of each of the circulation flow channel in the hot water circulation system and the circulation flow channel in the cooling water circulation system, the solid-liquid separation device storing a lot of filter mediums each of which is provided with a lot of rectangular water stream inlets in a staggered pattern along a peripheral direction, is provided with a semicircularly curved water stream control plate extending inward from a short side in one side of each of the water stream inlets and has a diameter of 12 mm and a length of 12 mm.

Further, in the structure mentioned above, a rate of the silicon dioxide ($SiO_2$) and the sodium oxide ($Na_2O$) in the scale inhibiting agent may be set to 50%:50%.

Further, in the structure mentioned above, a rate of the silicon dioxide ($SiO_2$) and the sodium oxide ($Na_2O$) in the scale inhibiting agent may be set to 60% to 70%:40% to 30%.

Further, in the structure mentioned above, the scale inhibiting agent may be mixed with one or more of aluminum oxide ($Al_2O_3$), magnesium oxide (MgO), potassium carbonate ($K_2CO_3$) and boron trioxide ($B_2O_3$).

Effect of Invention

The binary power generation system according to the present invention is structured, as mentioned above, such that the scale inhibiting agent is put into the circulation flow channel in the hot water circulation system and the circulation flow channel in the cooling water circulation system, and the solid-liquid separation device is installed at the appropriate position of each of the circulation flow channel in the hot water circulation system and the circulation flow channel in the cooling water circulation system. Therefore, it is possible to suppress the attachment of the scale onto the surface within the plumbing constructing the circulation flow channel and the surface of the plate in the heat exchanger, thereby preventing the reduction of the power generation capacity in the binary power generation.

The scale inhibiting agent used in the present invention has the silicon dioxide ($SiO_2$) and the sodium oxide ($Na_2O$) as the main component, further includes one or more of the aluminum oxide ($Al_2O_3$), the magnesium oxide (MgO), the potassium carbonate ($K_2CO_3$) or the boron trioxide ($B_2O_3$) as occasion demands, and is a water-soluble amorphous massive body.

Then, in a case where the scale inhibiting agent is put into the circulation flow channel in the hot water circulation system and the circulation flow channel in the cooling water circulation system, it is dissolved little by little after being put because of the water-soluble amorphous and the component thereof is mixed into the water. Further, on the basis of the action of the silicon dioxide ($SiO_2$) and the sodium oxide ($Na_2O$) corresponding to the main components, and the aluminum oxide ($Al_2O_3$), the magnesium oxide (MgO), the potassium carbonate ($K_2CO_3$) or the boron trioxide ($B_2O_3$) added as occasion demands, the attachment of the scale onto the surface within the plumbing constructing the circulation flow channel and the surface of the plate in the heat exchanger is suppressed, or the attached and deposited silica based scale is dissolved and removed, and the other scales than the silica based scale are simultaneously removed. Further, it is possible to prevent the scale from being generated, and it is possible to prevent the plumbing and the like constructing the circulation flow channel from being corroded by forming an anticorrosive coating on the inner surface thereof.

Further, the silicon dioxide ($SiO_2$) and the sodium oxide ($Na_2O$) corresponding to the components are all safe inorganic components and may not therefore result in causing an adverse effect on the human body and the environment. Further, in view of concentration, concentration beyond an appropriate value may not result in damaging the circulation flow channel. As described above, the scale inhibiting agent used in the present invention is constituted only by the safe mineral components, and conforms to a drainage water standard. Further, the amorphous massive body is solid, can be uniformly dissolved and is further easily carried and stored.

Further, the solid-liquid separation device installed at the appropriate position of each of the circulation flow channel in the hot water circulation system and the circulation flow channel in the cooling water circulation system can efficiently suppress the attachment of the scale onto the surface within the plumbing constructing the circulation flow channels and the surface of the plate in the heat exchanger by separating the solid material suspended in the water and discharging it out of the system. Further, the chemical cleaning of the heat exchanger performed in the conventional binary power generation is not required. Further, it is necessary to stop the operation of the system when cleaning the conventional heat exchanger. However, according to the present invention, the system is not necessarily stopped for cleaning and the power generation capacity is not lowered.

FIG. 6 shows results of experiments according to the present invention, which correspond to results obtained by analyzing a drain water in the solid-liquid separation device. As a result, it is clear that the solid materials having grain diameters between about 1 μm and about 70 μm are completely removed.

DESCRIPTION OF EMBODIMENTS

A description will be further in detail given below of a mode for carrying out the present invention with reference to the accompanying drawings.

Figure 1:
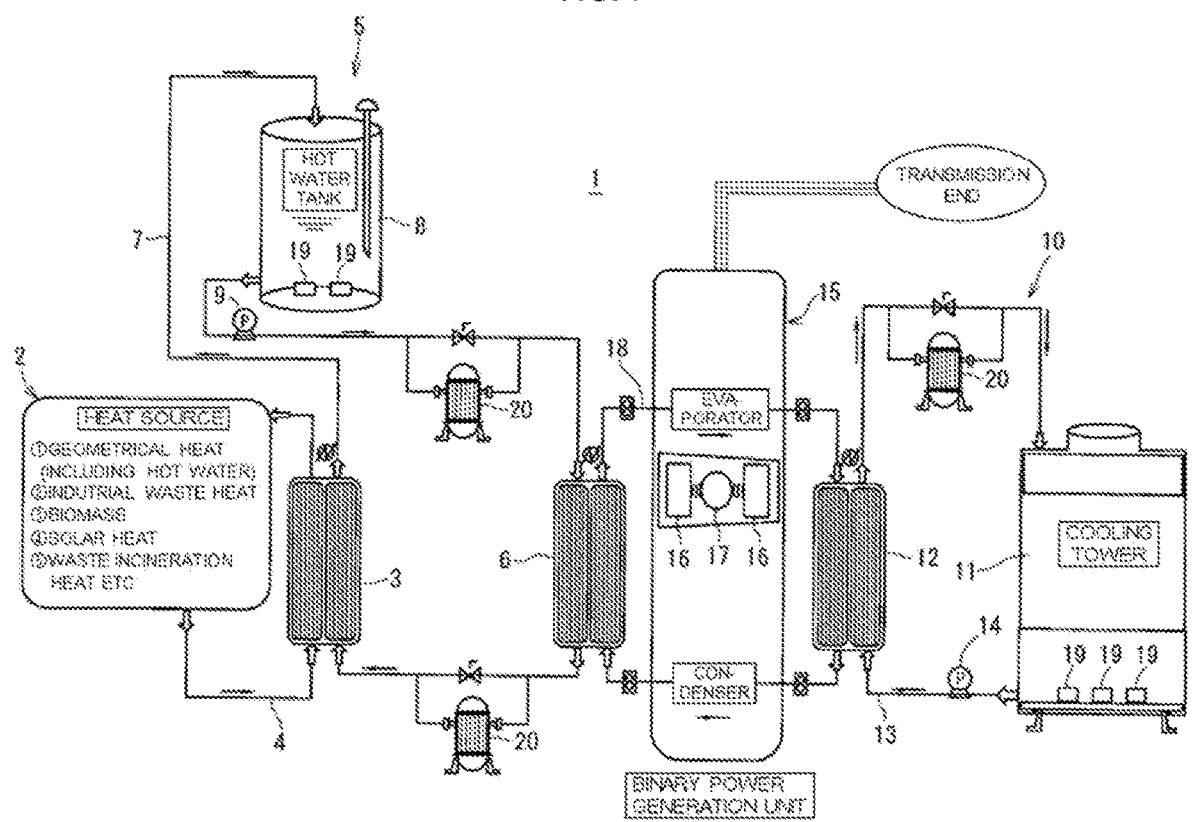
FIG. 1 is a schematically explanatory view of a binary power generation system according to an embodiment of the present invention.

FIG. 1 is a schematically configuration view of a binary power generation system 1 utilizing renewable energy such as geothermal heat according to an embodiment of the present invention. Further, the binary power generation system 1 is constructed by a heat source such as the geothermal heat, a hot water circulation system which circulates a hot water, a working medium circulation system, and a cooling water circulation system which circulates a cooling water.

Reference numeral 2 denotes the heat source. Geothermal heat, industrial waste heat, biomass, solar heat and waste incineration heat are used for the heat source. Further, the heat generated by the heat source 2 is circulated by a circulation flow channel 4 which is connected in its midstream portion to a heat exchanger 3 increasing the temperature of a hot water.

Reference numeral 5 denotes the hot water circulation system. Further, the hot water circulation system 5 circulates the hot water with a circulation flow channel 7 which is connected in its midstream portion to the heat exchanger 3 and a heat exchanger 6 heating and evaporating a liquid working medium mentioned later. Further, reference numeral 8 denotes a hot water tank which is installed in a midstream portion of the circulation flow channel 7, and reference numeral 9 denotes a pump which circulates the hot water in the circulation flow channel 7.

Reference numeral 10 denotes the cooling water circulation system. Further, the cooling water circulation system 10 circulates the cooling water with a circulation flow channel 13 which connects a cooling tower 11 and a heat exchanger 12 cooling and condensing the steam rotating a turbine mentioned later. Reference numeral 14 denotes a pump which circulates the cooling water in the circulation flow channel 13. Tap water, groundwater and river water are employed as cooling water.

Reference numeral 15 denotes a working medium circulation system. Further, the working medium circulation system 15 includes a turbine 16 and a power generator 17, connects the heat exchanger 6 and the heat exchanger 12 with a circulation flow channel 18, and circulates the working medium with a pump (not shown). Alternative for chlorofluorocarbon (HFC-245fa) is employed as the working medium. Further, the heat exchangers 3, 6 and 12 all employ a plate type heat exchanger in the present embodiment.

Accordingly, the binary power generation system according to the present embodiment is characterized in that a scale inhibiting agent mentioned later is put into each of the circulation flow channel 7 in the hot water circulation system 5 and the circulation flow channel 13 in the cooling water circulation system 10, and a solid-liquid separation device mentioned later is installed at an appropriate position of each of the circulation flow channel 7 in the hot water circulation system 5 and the circulation flow channel 13 in the cooling water circulation system 10. The scale inhibiting agent is put into water within a hot water tank 8 and a cooling tower 11 in the present embodiment. Further, the scale inhibiting agent is put into while being accommodated in a basket-shaped or mesh-shaped package body and is dissolved little by little after being put into, and a component thereof flows within the circulation flow channels 7 and 13, and normalizes a surface within a plumbing constructing the circulation flow channels 7 and 13 and a surface of a plate in a heat exchanger. Further, the scale inhibiting agent is put into at an appropriate amount while checking an amount of a circulating water and a water quality (pH, electric conductivity, total hardness, Ca hardness, ionic silica). A standard input amount is based on a rough standard of 20 ppm (0.002%) for an amount of the circulation water ($m^3h$ or L/m).

Figure 2:
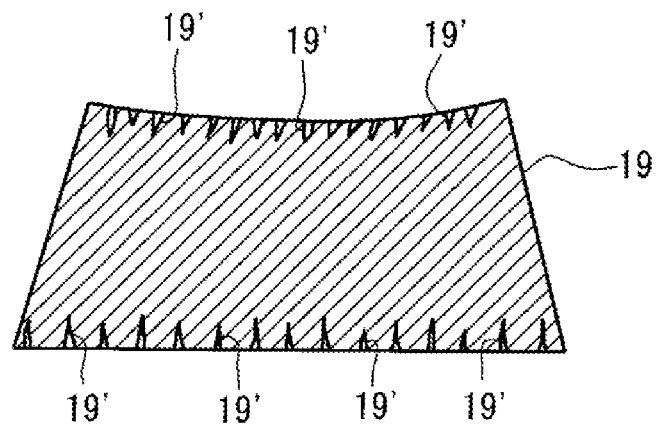
FIG. 2 is a perspective view of a scale inhibiting agent used in the binary power generation system according to the embodiment of the present invention.

FIG. 2 shows the scale inhibiting agent 19. Cracks 19', 19' . . . each having a depth between 1 mm and 1.5 mm from a surface thereof are formed in the scale inhibiting agent 19. Further, the scale inhibiting agent 19 has silicon dioxide ($SiO_2$) and sodium oxide ($Na_2O$) as main components, further includes oxides of an alkali metal as occasion demands, and is a massive form or a granular form of a water-soluble amorphous. Further, in the scale inhibiting agent 19, a rate of silicon dioxide ($SiO_2$) and sodium oxide ($Na_2O$) may be set to 50%:50% or 60% to 70%:40% to 30%.

Further, the scale inhibiting agent 19 may include oxides of an alkali metal constituted by one or more of aluminum oxide ($Al_2O_3$), magnesium oxide (MgO) and boron trioxide ($B_2O_3$).

Further, potassium carbonate ($K_2CO_3$) may be included in addition to the components mentioned above.

Accordingly, the scale inhibiting agent 19 is preferably used for a water channel system in an air conditioning unit and a heat exchanger, in particular a water channel system circulating water, and is used by being put in the water channel systems.

Figure 3:
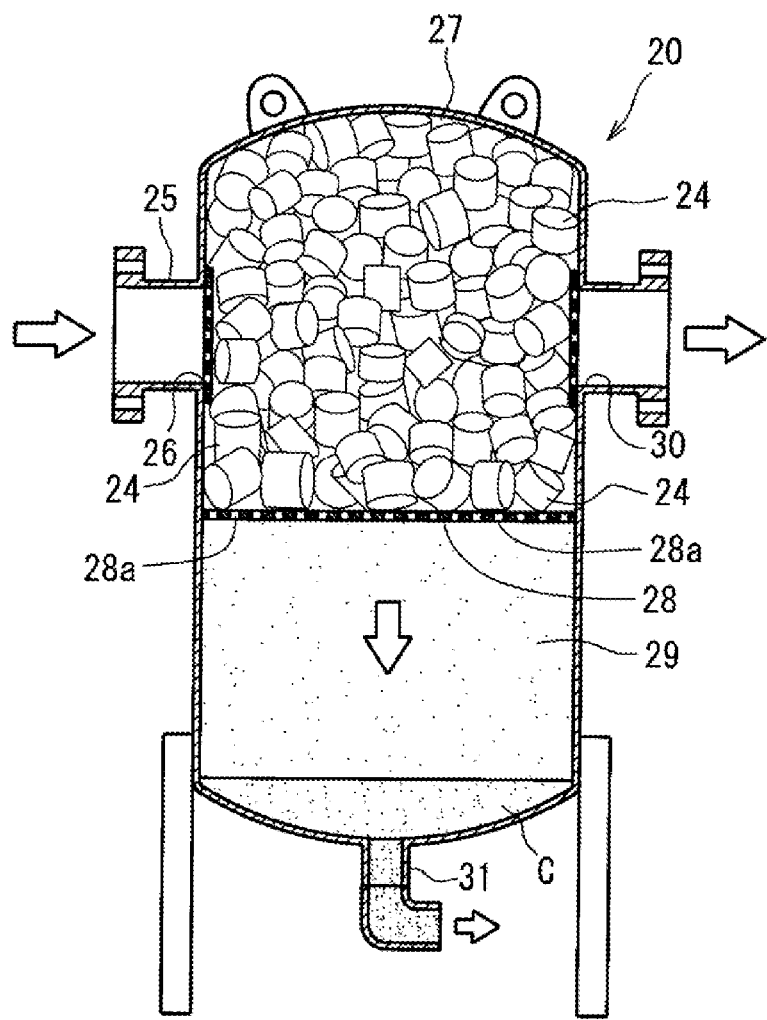
FIG. 3 is a centrally vertical cross sectional view of a solid-liquid separation device used in the binary power generation system according to the embodiment of the present invention.
Figure 4:
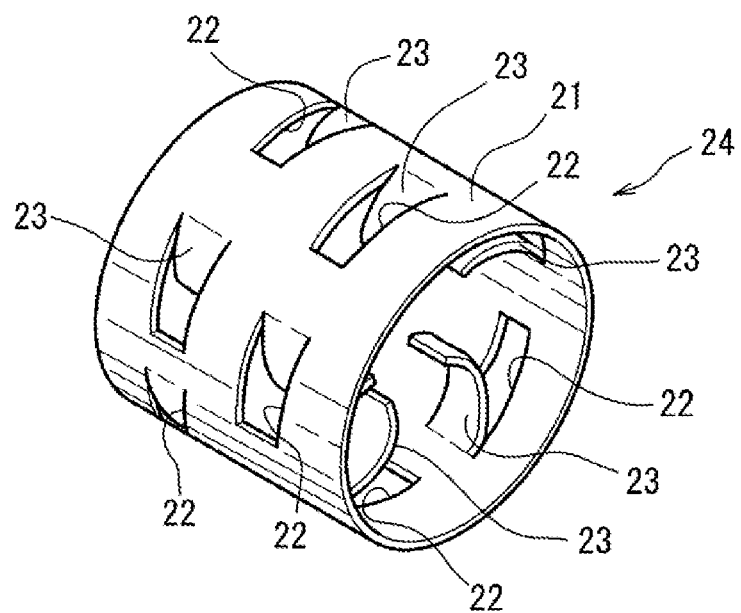
FIG. 4 is a perspective view of a filter medium filled into an inner portion of the solid-liquid separation device used in the binary power generation system according to the embodiment of the present invention.
Figure 5:
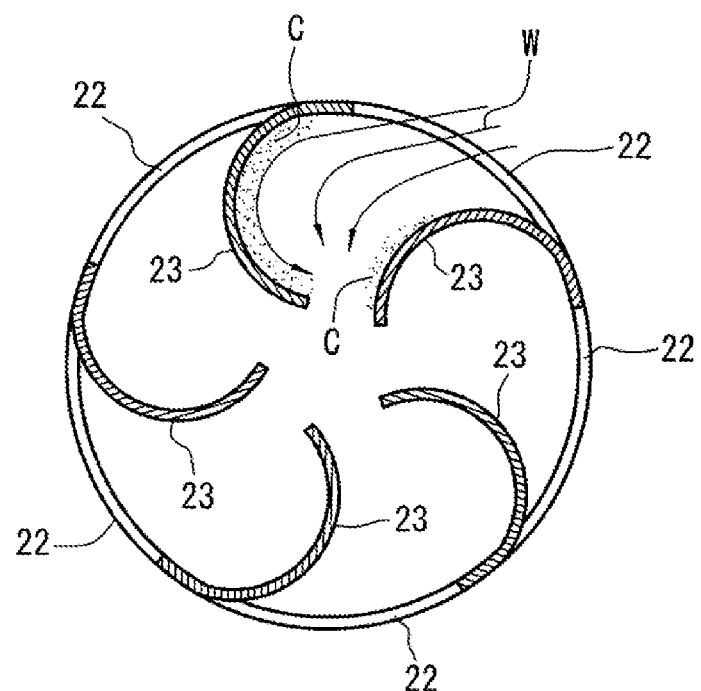
FIG. 5 is a cross sectional view of the filter medium filled into the inner portion of the solid-liquid separation device used in the binary power generation system according to the embodiment of the present invention.
Figure 6:
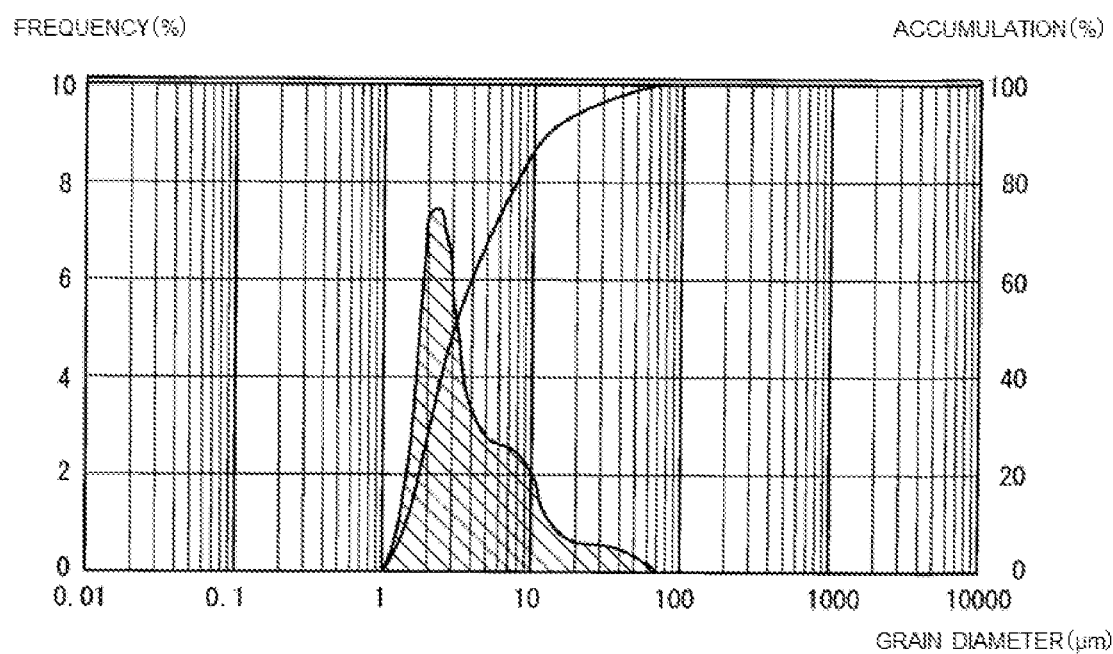
FIG. 6 is results obtained by analyzing a drain water from the solid-liquid separation device in the binary power generation system according to the embodiment of the present invention.

FIGS. 3 to 5 show the solid-liquid separation device 20. Further, the solid liquid separation device 20 is configured to store therein a lot of filter mediums 24 each of which is provided in an annular filter medium main body 21 with a lot of rectangular water stream inlets 22, 22, . . . in a staggered pattern along a peripheral direction thereof, is provided therein with semicircularly curved water stream control plates 23, 23, . . . extending inward from a short side in one side of each of the water stream inlets 22, 22, . . . and has a diameter of 12 mm and a length of 12 mm.

Next, a description will be given of an operation of the solid-liquid separation device 20.

As shown in FIG. 3, the water mixed with solid impurities is solid-liquid separated by the filter mediums 24, 24, . . . filled in a separation chamber 27, the solid impurities flowing into the solid-liquid separation device 20 from a water inflow port 26 via a water passing tube 25. The solid material passes through a small opening 28a of a baffle plate and settles in a solid material settling chamber 29, and the separated water flows out of a water outflow port 30. In this case, the solid material C settling in the solid material settling chamber 29 is deposited on the bottom portion thereof and is discharged out of a solid material discharge port 31 at a predetermined timing. Further, when discharging the solid material C, a system can be set to maintenance-free by automatically draining very predetermined periods with a timer.

Further, a separating action achieved by the filter medium 24 is as shown in FIG. 5. When the water flows into the filter medium main body 21 from each of a lot of water stream inlets 22, 22, . . . provided in the filter medium 24, the inflowing water flows into a space between front and rear water stream control plates 23 and 23 at the same row in the semicircularly curved water stream control plates 23, 23, . . . of the respective water stream inlets 22, 22, . . . , and forms a rotating flow. Further, at this time, the solid material having a great difference in specific gravity collides with front faces of the water stream control plates 23 and 23 in one side hit by the water, and the solid material left in the water stream collides with rear faces of the water stream control plates 23 and 23 in the other side, so that the solid material in the water is separated. Further, the separated solid material is swept away by the water flowing into from a side direction of the filter medium main body 21, and settles. Reference sign W denotes a water stream, and reference sign C denotes a solid material.

As mentioned above, the solid-liquid separation is performed at a plurality of positions in the single filter medium 24, a lot of filter medium 24 are filled in the separation chamber of the solid-liquid separation device 20, and the filter medium 24 are filled in irregular directions. Therefore, the water stream within the separation chamber of the solid-liquid separation device 20 forms a turbulent flow and comes into contact with the filter medium 24 in succession. Thus, it is possible to significantly improve separation efficiency in comparison with the conventional solid-liquid separation device. Further, the solid-liquid separation is performed on the basis of the action mentioned above. Therefore, it is possible to separate and remove the solid material having a very small grain diameter between about 1 μm and about 70 μm. Further, it is not necessary to frequently clean due to no clogging generation, and it is possible to make a reverse cleaning requiring a lot of water unnecessary. Further, in a case where both the solid-liquid separation device 20 and the filter medium 24 are made of stainless steel, it is possible to use for a long time period with no corrosion. In the present embodiment, three solid-liquid separation devices 20 are used, however, do not put a burden on a pump since a pressure loss is equal to or less than 0.012 MPa (0.12 Kgf/cm$^2$) and is very small, thereby comprising no obstacle.

The invention claimed is:

1. A binary power generation system utilizing a renewable energy, the binary power generation system comprising:
   a heat source;
   a hot water circulation system which circulates a hot water heated by the heat source;
   a working medium circulation system including a turbine which circulates a working medium and is rotated by a steam, and a power generator; and
   a cooling water circulation system which circulates a cooling water cooled by a cooling tower;
   wherein a scale inhibiting agent including silicon dioxide ($SiO_2$) and sodium oxide ($Na_2O$) as main components is put into each of a circulation flow channel in the hot water circulation system and a circulation flow channel in the cooling water circulation system, the scale inhibiting agent being a massive form and having cracks each having a depth between 1 mm and 1.5 mm from a surface thereof, and
   wherein a solid-liquid separation device is installed at an appropriate position of each of the circulation flow channel in the hot water circulation system and the circulation flow channel in the cooling water circulation system, the solid-liquid separation device storing a lot of filter mediums each of which is provided with a lot of rectangular water stream inlets in a staggered pattern along a peripheral direction, is provided with a semicircularly curved water stream control plate extending inward from a short side in one side of each of the water stream inlets and has a diameter of 12 mm and a length of 12 mm.

2. The binary power generation system utilizing renewable energy according to claim 1, wherein the scale inhibiting agent is put into the water within a hot water tank of the circulation flow channel in the hot water circulation system, and the water within a cooling tower of the circulation flow channel in the cooling water circulation system.

3. The binary power generation system utilizing renewable energy according to claim 1, wherein a rate of the silicon dioxide ($SiO_2$) and the sodium oxide ($Na_2O$) in the scale inhibiting agent is set to 50%: 50%.

4. The binary power generation system utilizing renewable energy according to claim 1, wherein a rate of the silicon dioxide (SiO2) and the sodium oxide ($Na_2O$) in the scale inhibiting agent is set to 60% to 70%: 40% to 30%.

5. The binary power generation system utilizing the renewable energy according to claim 1, wherein the scale inhibiting agent according to claim 1 is mixed with one or more of aluminum oxide ($Al_2O_3$) magnesium oxide (MgO), potassium carbonate ($K_2CO_3$) and boron trioxide ($B_2O_0$).

6. The binary power generation system utilizing the renewable energy according to claim 1, wherein the heat source is any one of geothermal heat, industrial waste heat, biomass, solar heat, and waste incineration heat.

7. The binary power generation system utilizing the renewable energy according to claim 1, wherein the heat source is geothermal heat.

* * * * *